United States Patent Office 3,662,027
Patented May 9, 1972

3,662,027
NITRILE TETRAPOLYMER-POLYVINYL-
CHLORIDE BLENDS
Richard W. Czerwinski, Vienna, and Ralph P. Arthur, Parkersburg, W. Va., assignors to Borg-Warner Corporation, Chicago, Ill.
No Drawing. Filed Oct. 26, 1970, Ser. No. 84,213
Int. Cl. C08f 29/12, 29/56
U.S. Cl. 260—891                                    13 Claims

ABSTRACT OF THE DISCLOSURE

A homogeneous blend of a vinyl halide polymer, particularly polyvinyl chloride (10 to 90%) with an improved nitrile elastomer comprising, by weight, 30 to 90 parts butadiene, 10 to 50 parts acrylonitrile, 1 to 9 parts of an alkyl acrylate, and 1 to 9 parts α-chloroacrylonitrile. These blends, which are useful for mechanical goods, hose, electrical insulation and shoe soles, have been found to exhibit excellent color retention, superior abrasion resistance, and improved aging, compression set, and tear resistance properties. The improved physical properties permit the incorporation of larger amounts of low-cost extenders and fillers, thereby reducing overall compound costs.

BACKGROUND AND SUMMARY OF THE INVENTION

This invention relates generally to blends of polyvinylhalides, particularly polyvinylchloride, and modified nitrile elastomers. More particularly, the invention is directed to new compositions of matter in which polyvinylchloride (PVC), in amounts of 10 to 90% by weight, is blended with 90 to 10% by weight of an improved tetrapolymer consisting essentially, by weight, of 30 to 90 parts butadiene, 10 to 50 parts acrylonitrile, 1 to 9 parts of an alkyl acrylate, and 1 to 9 parts α-chloroacrylonitrile. The tetrapolymers referred to above, and their method of manufacture, are more particularly described in copending application Ser. No. 61,439, filed on Aug. 5, 1970 by Ralph P. Arthur et al.

The prior art which is pertinent to the present invention includes U.S. Pat. 2,330,353, issued on Sept. 28, 1943 to Donald E. Henderson which describes various compositions in which a nitrile rubber is mechanically blended with a polyvinylhalide. It is pointed out in Henderson that these materials, in general, have improved high temperature properties which extend the range of applications for both the polyvinylchloride *and* the nitrile rubbers. The compositions have, in addition, superior physical properties which are not simply an extrapolation of the high and low temperature properties of each individual constituent.

The present invention is more particularly directed to blends of improved nitrile rubber in combination with a polyvinylhalide which exhibit superior abrasion and aging resistance, compression set, tear resistance, and color retention. In addition, it has been found that they are compatible with conventional flame retardant additives such that the normally flammable nitrile rubber can be made self-extinguishing.

The blends of the present invention may be prefluxed, thereby eliminating the need for heating or mixing equipment by the compounder. Also, higher than normal temperatures are not required during any stage of the mixing procedure; and conventional rubber processing techniques and equipment may be utilized.

DETAILED DESCRIPTION OF THE INVENTION

The following description is organized as follows: (a) preparation of typical nitrile tetrapolymers as further described in copending application Ser. No. 61,439; (b) preparation of PVC-nitrile tetrapolymer blends; (c) description of typical compounding procedures; (d) preparation of various compounded blends for different applications; and (e) comparative physical test data for different materials. In all of the examples, recipes etc., the amounts of each component is in parts by weight unless otherwise indicated.

EXAMPLE I

Preparation of improved nitrile tetrapolymer

In copending application Ser. No. 61,439, referred to above, a number of examples are described in which butadiene, acrylonitrile, α-chloroacrylonitrile and an alkyl acrylate are copolymerized to provide a nitrile elastomer having improved properties. Such alkyl acrylates are of the formula:

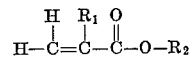

wherein: $R_1$ is selected from the group consisting of hydrogen and methyl radical; and $R_2$ is a $C_1$–$C_8$ alkyl radical. These examples, which are intended to be incorporated herein by reference, recite varying compositions of the tetrapolymer, substantially all of which are useful in the preparation of tetrapolymer-PVC blends of the present invention. However, for purposes of illustrating at least one example of the present disclosure, a preferred method of preparing such tetrapolymers is recited below:

An emulsion was prepared from the following recipe:

| | |
|---|---|
| DM water | 142 |
| Potassium hydroxide | 0.132 |
| Potassium chloride | 0.5 |
| Sodium formaldehyde hydrosulfite | 0.2 |
| Disodium salt EDTA | 0.15 |
| Sodium salt of lauryl alcohol sulfate | 4.5 |
| Ferrous sulfate | 0.0024 |
| Ammonium persulfate | 0.2 |
| Mixed tert. mercaptans | 0.4 |
| Butadiene-1,3 (BD) | 65.0 |
| Acrylonitrile (VCN) | 30.0 |
| α-Chloroacrylonitrile (α-CLAN) | 2.0 |
| Ethyl achylate (EtAc) | 5.0 |

The emulsion prepared of the above monomers was placed in a pressure container and the persulfate catalyst added. The container was agitated in a thermostated bath for 16 hours at 20° C. Polymerization was stopped by addition of a conventional shortstop, such as sodium dimethyldithiocarbamate, at approximately 80% conversion. The latex was coagulated using $Al_2(SO_4)_3$ and dried in a hot air oven at 100° C.

The procedure described in Example I was repeated with other alkyl acrylates in the same proportion, i.e., 65/30/2/5-BD/VCN/α-CLAN/alkyl acrylate. For convenience, the tetrapolymers will be designated A, B etc. in accordance with the following table:

TABLE I

| Tetrapolymer | A | B | C | D |
|---|---|---|---|---|
| BD | 65 | 65 | 65 | 65 |
| VCN | 30 | 30 | 30 | 30 |
| α-CLAN | 2 | 2 | 2 | 2 |
| EtAc | 5 | | | |
| Methyl methacrylate | | 5 | | |
| Butyl acrylate | | | 5 | |
| 2-ethylhexyl acrylate | | | | 5 |

EXAMPLE II

Preparation of PVC-tetrapolymer blends

Blends of the high temperature tetrapolymer (dried coagulum) prepared in accordance with Example I were combined with PVC resin in accordance with the following table:

TABLE II

| Blend | I | II | III | IV | V | VI | VII | VIII |
|---|---|---|---|---|---|---|---|---|
| Tetrapolymer: | | | | | | | | |
| A | 70 | | | | | 50 | 25 | 10 |
| B | | 70 | | | | | | |
| C | | | 70 | | | | | |
| D | | | | 70 | 70 | | | |
| PVC [1] | 30 | 30 | 30 | 30 | 30 | 50 | 75 | 90 |
| Organotin PVC [2] stabilizer | 1.0 | 1.0 | 1.0 | 1.0 | 1.0 | 1.0 | .75 | .90 |
| Calcium stearate | | | | | | | 1.0 | |
| Antimony oxide | | | | | 5.0 | | | |
| Epoxide-type PVC [3] stabilizer | .5 | .5 | .5 | | | | | |

[1] Pliovic S-50, Goodyear Tire & Rubber Co.
[2] Mark A, Argus Chemical Co.
[3] Paraplex G-62, Rohm & Haas.

EXAMPLE III

Compounding procedure

The blends of Example II (and other commercial PVC-nitrile rubber blends) are compounded on a two roll mill or by the following Banbury procedure:

Time (minutes):

| | Procedure |
|---|---|
| 0–2 | Add PVC-nitrile rubber blend to mixer. |
| 2–4 | Add ¼ to ½ dry powders. |
| 4–6 | Add plasticizers and waxes. |
| 6–8 | Add remainder of powders. |
| 8+ | Drop at about 260–270° F. |

Accelerators added on cool sheet off mill.

EXAMPLE IV

Compounded blend recipes for various applications

Compositions which have special utility in the manufacture of wire and cable insulating jackets were prepared by the technique described in Example III as follows:

TABLE III

| Composition | I | II | III |
|---|---|---|---|
| Blend I (Table II) | 100.0 | | |
| Blend V (Table II) | | 100.0 | |
| Commercial Blend M [1] | | | 100.0 |
| Zinc oxide | 3.0 | 3.0 | 3.0 |
| Stearic acid | 1.0 | 1.0 | 1.0 |
| Hard clay (Suprex) | 80.0 | 80.0 | 80.0 |
| Dioctyl phthalate (DOP) | 25.0 | 25.0 | 25.0 |
| Chlorinated polyphenyls (CP) [2] | 3.0 | 3.0 | 3.0 |
| Sulfur | 1.5 | 1.5 | 1.5 |
| Mercaptobenzothiazyl disulfide (MBTD) | 1.0 | 1.0 | 1.0 |
| Tetramethylthiuram disulfide (TMD) | .5 | .5 | .5 |
| Total | 215.0 | 215.0 | 215.0 |

[1] A PVC/nitrile rubber blend (70/30) identified as Paracril OZO manufactured by Uniroyal Corporation.
[2] Aroclor 1254 manufactured by Monsanto Chemical Co.

After removal from the sheet off mill, these compositions were cured in an ASTM mold for 5 minutes at 350° F.

Compositions which are useful in extra heavy duty electrical jackets were prepared as follows:

TABLE IV

| Composition | IV | V | VI |
|---|---|---|---|
| Blend I (Table II) | 100.0 | | |
| Blend V (Table II) | | 100.0 | |
| Commercial Blend N [1] | | | 100.0 |
| Zinc oxide | 3.0 | 3.0 | 3.0 |
| Stearic acid | 1.0 | 1.0 | 1.0 |
| Hydrated silica | 40.0 | 40.0 | 40.0 |
| DOP | 15.0 | 15.0 | 15.0 |
| CP | 3.0 | 3.0 | 3.0 |
| Sulfur (Spider) | 1.0 | 1.0 | 1.0 |
| MBTD | 1.0 | 1.0 | 1.0 |
| TMD | .5 | .5 | .5 |
| Total | 164.5 | 164.5 | 164.5 |

[1] A PVC/nitrile rubber blend (70/30) identified as Paracril 3506 manufactured by Uniroyal Corporation.

After removal from the sheet off mill, these compositions were cured in an ASTM mold for 5 minutes at 350° F.

A commercial 50/50 blend and the 50/50 blend, identified as Blend VI in Table II, were both compounded in accordance with the following table:

TABLE V

| Composition | VII | VIII |
|---|---|---|
| Blend VI | 100.0 | |
| Blend O [1] | | 100.0 |
| Zinc oxide | 3.0 | 3.0 |
| Wax (sunproof) | 3.0 | 3.0 |
| Stearic acid | 1.0 | 1.0 |
| Hard clay | 100.0 | 100.0 |
| DOP | 30.0 | 30.0 |
| MBTD | 2.0 | 2.0 |
| Tetramethylthiuram monosulfide | .5 | .5 |
| Sulfur | 1.5 | 1.5 |
| Diphenyl guanidine | .5 | .5 |
| 4,4'-thiobis-(6-tert.-butylmeta-cresol) | 2.0 | 2.0 |
| Total | 242.0 | 242.0 |

[1] A PVC/nitrile rubber blend (50/50) identified as Paracril OZO-50 manufactured by Uniroyal Corporation.

The above samples were compression molded for 10 minutes at 320° F.

Compositions referred to as I to VIII inclusive were tested under various conditions to determine their original and aged properties in accordance with the following table:

TABLE VI

| Composition | I | II | III | IV | V | VI | VII | VIII |
|---|---|---|---|---|---|---|---|---|
| Blend used (Table II) | I | V | M | I | V | N | VI | O |
| Type (PVC/rubber) | 70/30 | 70/30 | 70/30 | 70/30 | 70/30 | 70/30 | 50/50 | 50/50 |
| Flame retardant | No | Yes | No | No | Yes | No | No | No |
| Original properties: | | | | | | | | |
| Tensile [1] | 1,640 | 1,912 | 1,475 | 3,050 | 3,090 | 2,600 | 1,780 | 1,650 |
| Elongation [2] | 605 | 600 | 620 | 720 | 665 | 675 | 450 | 375 |
| Hardness [3] | 72 | 72 | 69 | 80 | 78 | 75 | 74 | 74 |
| Tear [4] | 222 | 248 | 192 | 386 | 400 | 349 | 290 | 220 |
| Modulus 100% [5] | 590 | 635 | 495 | 460 | 580 | 445 | | |
| Modulus 300% [5] | 985 | 1,080 | 760 | 1,080 | 1,405 | 1,000 | | |
| Mooney scorch [6] | 34 | 38 | 46 | | | | | |
| Hot air aging: [7] | | | | | | | | |
| (a) 168 hours at 212° F.: | | | | | | | | |
| Tensile | 2,137 | 2,312 | 1,850 | 3,240 | 3,717 | 2,350 | 2,400 | 1,820 |
| Elongation | 240 | 240 | 102 | 400 | 375 | 283 | 170 | 140 |
| Modulus (100%) | 1,450 | 1,625 | 1,825 | 850 | 1,183 | 850 | 85 | 86 |
| Hardness | 82 | 85 | 85 | 81 | 82 | 79 | | |
| Tear | 292 | 272 | 212 | 292 | 272 | 212 | 250 | 210 |
| (b) 168 hours at 250° F.: | | | | | | | | |
| Tensile | 2,750 | 2,945 | 1,150 | 2,525 | 2,650 | 1,300 | | |
| Elongation | 155 | 110 | 15 | 122 | 100 | 40 | | |
| Modulus (100%) | 2,200 | 2,750 | | 2,066 | 2,458 | | | |
| Hardness | 82 | 88 | 93 | 92 | 92 | 95 | | |
| Tear | | | | 200 | 182 | 197 | | |
| (c) hours aged at 250° F. until sample cracked after 180° bend | 500 | 410 | 81 | 410 | 400 | 84 | | |

See footnotes at end of table.

TABLE IV—Continued

| Composition | I | II | III | IV | V | VI | VII | VIII |
|---|---|---|---|---|---|---|---|---|
| Oil aging; ASTM No. 2 oil at 250° F. for 18 hours: | | | | | | | | |
| Tensile | 1,965 | 2,000 | 1,545 | 3,430 | 3,150 | 2,515 | [8] 1,920 | [8] 1,525 |
| Elongation | 410 | 375 | 400 | 637 | 600 | 620 | | |
| Modulus (100%) | 995 | 1,145 | 750 | 725 | 915 | 550 | | |
| Modulus (300%) | 1,685 | 1,875 | 1,300 | 1,825 | 2,010 | 1,287 | | |
| Hardness | 78 | 76 | 73 | 78 | 75 | 75 | 88 | 86 |
| Moisture absorption:[9] | | | | | | | | |
| Distilled water 70 hours at 212° F.: | | | | | | | | |
| Tensile | 1,530 | 1,550 | 1,380 | 2,000 | 2,100 | [10] 1,700 | 2,090 | [10] 1,620 |
| Elongation | 680 | 680 | 690 | 650 | 690 | 740 | | |
| Modulus (300%) | 530 | 480 | 340 | 680 | 720 | 500 | | |
| Hardness | 57 | 62 | 56 | 67 | 68 | 6 3 | 67 | 63 |
| Percent volume change | 7.2 | 5.7 | 4.6 | 12.6 | 10.9 | 16.0 | 3.5 | 5.3 |
| Electrical properties: | | | | | | | | |
| Dielectric strength [11] | 330 | 316 | 375 | | | | | |
| Volume resistivity [12] ×10^10 | 6.21 | 6.49 | 4.55 | | | | | |
| Color retention: | | | | | | | | |
| (a) Aged 70 hours at 212° F. (percent retention of reflectance at 480 A.) | 70 | 74 | 43 | 66 | 71 | 42 | | |
| (b) Aged 70 hours at 250° F. (percent retention of reflectance at 480 A.) | 35 | 38 | 14 | 32 | 35 | 15 | | |
| Low temperature [13] brittle point: | | | | | | | | |
| Pass (° F.) | 50 | −50 | −60 | | | | | |
| Fail (° F.) | −55 | −55 | −65 | | | | | |
| Abrasion resistance [14] (Taber); weigh loss (mg.) | 38 | 22 | 170 | 6 | 3 | 8 | 9 | 21 |
| Flame retardance; [15] U.L. test-vertical | Burns | [16] | Burns | Burns | [16] | Burns | | |

[1] Tensile strength—ASTM D 412, p.s.i.; [2] Elongation—ASTM D 412, percent of original; [3] Hardness (Shore)—ASTM D 676, A scale; [4] Tear strength—ASTM D 624, lbs./inch, C tear (Crescent tear); [5] Modulus—ASTM D 412 p.s.i. at 100% and 300% elongation; [6] Mooney Scorch—ASTM D 1077, 10 point rise in minutes, small rotor at 10 units at 250° F.; [7] Hot air aging—ASTM D 573; [8] Aged 24 hours at 250° F.; [9] Moisture absorption—immersion test, ASTM D 471; [10] Aged 24 hours at 212° F.; [11] Dielectric strength—ASTM D 150, volts/ml.; [12] Volume resistivity—ASTM D 257, ohms-cm.; [13] Low temperature brittle point—ASTM D 746, ° F.; [14] Abrasion resistance (Taber)—ASTM C 501, weight loss in mgs., H22 wheel, 250 gm. weight; 5,000 revolutions; [15] Flame retardance—U.L. Test Group 94 vertical; [16] Pass U.L. 94 Group I.

EXAMPLE V

Thermolastic resin blends

Blends in the resin range (over 50% PVC) are also useful. The blends identified as VII and VIII (Table II) were molded into 6 x 6 x ⅛ in. specimens and tested along with a 25/75 nitrile rubber/PVC blend. The latter was compounded in the same manner as Blend VII and made up from a commercial medium nitrile rubber (Hycar 1042—B. F. Goodrich Chemical Co.) and a medium molecular weight PVC (Pliovic S-50—Goodyear Tire and Rubber Co.). The physical properties are shown in the table below:

TABLE VII

| | Blend VII (of Table II) | Hycar/ Pliovic | Blend VIII (of Table II) |
|---|---|---|---|
| Rubber/PVC | 25/75 | 25/75 | 10/90 |
| Ult. tensile, p.s.i. | 5,400 | 3,800 | 7,100 |
| Izod impact, ft. lbs./in. | 26.8 | 23.6 | 1.5 |
| Elongation, percent | 315 | 130 | 100 |
| Flexural modulus | 1.9×10^5 | 1.6×10^5 | 3.9×10^5 |
| Heat deflection temperature (264 p.s.i.), ° F. | 96 | 95 | 122 |

In referring to vinyl chloride polymers herein, these may be any resinous polymers of vinyl chloride, or resinous copolymers thereof with minor proportions of other unsaturated compounds copolymerizable therewith. With respect to the resinous copolymers, these constitute a well-known class of materials, the essential feature of which is that the molecules thereof partake essentially of the normal polymeric chain structure of simple vinyl chloride polymers with the exception that the chains are interspersed at intervals with the vestiges of other extraneous unsaturated compounds which have been drawn into the polymerizaion. Providing (1) that the extraneous unsaturated compounds have not entered the copolymer to the extent of more than about 20%, based on the weight of copolymer and (2) that the extraneous compounds are not of the crosslinking type, i.e., do not contain plural, independently reactive unsaturated groups capable of entering different polymeric chains, the essential character of the vinyl chloride resin is not changed by the incorporation of these extraneous unsaturated compounds, beyond a certain advantageous plasticization and increased solubility and compatibility imparted by the discontinuity of the copolymeric chain. Vinyl chloride will also tolerate, in its copolymers, up to about 2% of crosslinking comonomers without departure from the essential properties of a simple vinyl chloride polymer.

In referring to acrylic nitriles, it should be understood that such materials are considered to be of the acrylonitrile-type compounds having the formula:

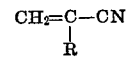

in which R represents a hydrogen atom or an alkyl radical containing 1 to 8 carbon atoms.

A halogenated acrylic nitrile means a composition of the acrylonitrile type referred to above wherein R is a halogen atom. Where reference is made to a butadiene-1,3 hydrocarbon, it should be understood that such materials include isoprene, chloroprene and similar compositions.

While this invention has been described in connection with certain specific embodiments thereof, it is to be understood that this is by way of illustration and not by way of limitation; and the scope of the appended claims should be construed as broadly as the prior art will permit.

What is claimed is:

1. A composition composing a blend of 90 to 10% by weight (a) vinyl chloride polymer selected from the group consisting of homopolymers of vinyl chloride and copolymers of vinyl chloride with up to about 20% of other unsaturated compounds copolymerized therewith and (b) 10 to 90% by weight of a random tetrapolymer consisting essentially of, by weight, 30 to 90 parts of butadiene-1,3 hydrocarbon, 10 to 50 parts of an acrylic nitrile having the formula:

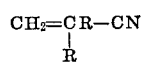

in which R represents a hydrogen atom or an alkyl radical containing 1 to 8 carbon atoms, 1 to 9 parts of a halogenated acrylic nitrile and 1 to 9 parts of an alkyl acrylate having the formula:

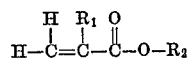

wherein: $R_1$ is selected from the group consisting of hydrogen and methyl radical; and $R_2$ is a $C_1$–$C_8$ alkyl radical.

2. A composition as defined in claim 1 wherein said vinyl chloride polymer is polyvinyl chloride.

3. A composition as defined in claim 1 wherein said acrylic nitrile is acrylonitrile.

4. A composition as defined in claim 1 wherein said halogenated acrylic nitrile is α-chloroacrylonitrile.

5. A composition as defined in claim 1 wherein said alkyl acrylate is ethyl acrylate.

6. A composition as defined in claim 1 wherein said alkyl acrylate is methyl methacrylate.

7. A composition as defined in claim 1 wherein said alkyl acrylate is butyl acrylate.

8. A composition as defined in claim 1 wherein said alkyl acrylate is 2-ethyl hexyl acrylate.

9. A composition as defined in claim 1 wherein said tetrapolymer comprises essentially, by weight, 64 parts butadiene-1,3, 29 parts acrylonitrile, 2 to 5 parts α-chloroacrylonitrile and 2 to 5 parts ethyl acrylate.

10. A vulcanizate of the blend defined in claim 1.

11. A composition comprising a blend of polyvinyl chloride and 10 to 90% by weight, based on said polyvinyl chloride, of a random tetrapolymer consisting essentially, by weight, of 30 to 90 parts butadiene, 10 to 50 parts acrylonitrile, 1 to 9 parts α-chloroacrylonitrile and 1 to 9 parts of an alkyl acrylate having the formula:

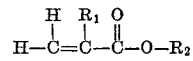

wherein: $R_1$ is selected from the group consisting of hydrogen and methyl radical; and $R_2$ is a $C_1$–$C_8$ alkyl radical.

12. A composition as defined in claim 1 containing 30% by weight polyvinyl chloride and 70% of said tetrapolymer.

13. A composition as defined in claim 1 containing 50% by weight polyvinyl chloride and 50% of said tetrapolymer.

References Cited

UNITED STATES PATENTS

| | | | |
|---|---|---|---|
| 3,399,155 | 8/1968 | Baer et al. | 260—23 |
| 2,395,017 | 2/1946 | Semon | 260—84.5 |
| 2,330,353 | 9/1943 | Henderson | 260—42 |

MURRAY TILLMAN, Primary Examiner

C. SECCURO, Assistant Examiner

U.S. Cl. X.R.

260—23 XA, 41 A, 45.75 R, 79.5 B, 80.7, 28.5 B